US010498546B2

(12) United States Patent
Chatras et al.

(10) Patent No.: US 10,498,546 B2
(45) Date of Patent: Dec. 3, 2019

(54) TECHNIQUE FOR COMMUNICATION BETWEEN A CLIENT ENTITY AND A PACKET MODE DATA NETWORK

(71) Applicant: Orange, Paris (FR)

(72) Inventors: Bruno Chatras, Paris (FR); Ali Amine Mouafik, Boulogne Billancourt (FR); Simon Bertrand, Paris (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 14/432,951

(22) PCT Filed: Sep. 24, 2013

(86) PCT No.: PCT/FR2013/052228
§ 371 (c)(1),
(2) Date: Jul. 2, 2015

(87) PCT Pub. No.: WO2014/053739
PCT Pub. Date: Apr. 10, 2014

(65) Prior Publication Data
US 2015/0295723 A1 Oct. 15, 2015

(30) Foreign Application Priority Data
Oct. 1, 2012 (FR) ...................... 12 59282

(51) Int. Cl.
H04L 12/14 (2006.01)
H04L 12/24 (2006.01)
H04B 1/38 (2015.01)

(52) U.S. Cl.
CPC ........... *H04L 12/1407* (2013.01); *H04B 1/38* (2013.01); *H04L 41/00* (2013.01)

(58) Field of Classification Search
None
See application file for complete search history.

(56) References Cited

U.S. PATENT DOCUMENTS 8,379,599 B2 * 2/2013 Velev .................... H04W 8/082
370/331
2010/0146131 A1 * 6/2010 Hu .......................... H04L 12/14
709/228
(Continued)

FOREIGN PATENT DOCUMENTS

CN    101072170 A    11/2007

OTHER PUBLICATIONS

English translation of the Written Opinion dated Apr. 1, 2015 for corresponding International Patent Application No. PCT/FR2013/052228, filed Sep. 23, 2013.
International Search Report and Written Opinion dated Dec. 6, 2013 for corresponding International Application No. PCT/FR2013/052228, filed Sep. 21, 2013.
(Continued)

*Primary Examiner* — Andrew C Oh
(74) *Attorney, Agent, or Firm* — David D. Brush; Westman, Champlin & Koehler, P.A.

(57) ABSTRACT

A technique is provided for communication between a client entity and a packet mode data network by way of a communication network implementing control and metering mechanisms. A method implemented by an entity for controlling rules includes the following acts: receiving from a rules application entity a request to open a control session relating to a communication session between a client entity and the data network; ordering this application entity to associate for the session with at least one application level message received from the client entity at least one information item relating to a resources control function, intended to be used by an application entity situated in the data network to implement a command of resources for this session.

14 Claims, 3 Drawing Sheets

(56) References Cited

U.S. PATENT DOCUMENTS

| | | | | |
|---|---|---|---|---|
| 2011/0106933 | A1* | 5/2011 | Lovsen | H04L 12/14 709/223 |
| 2011/0225280 | A1* | 9/2011 | Delsesto | H04L 29/12896 709/223 |
| 2011/0302289 | A1 | 12/2011 | Shaikh et al. | |
| 2012/0136992 | A1* | 5/2012 | Lopez Nieto | H04L 12/1407 709/224 |
| 2012/0243547 | A1* | 9/2012 | Pardo-Blazquez | H04L 12/14 370/401 |
| 2012/0314632 | A1* | 12/2012 | Martinez De La Cruz | H04L 65/1046 370/310 |
| 2013/0013794 | A1* | 1/2013 | Hu | H04L 12/14 709/227 |
| 2013/0041994 | A1* | 2/2013 | Terrien | H04L 43/16 709/223 |
| 2013/0138823 | A1* | 5/2013 | Centemeri | H04L 67/141 709/228 |
| 2013/0188554 | A1* | 7/2013 | Cai | H04M 15/65 370/328 |
| 2013/0311630 | A1* | 11/2013 | Chastain | H04L 12/1407 709/223 |
| 2013/0311672 | A1* | 11/2013 | Chastain | H04L 67/143 709/238 |
| 2014/0016513 | A1* | 1/2014 | Garcia Martin | H04L 51/38 370/259 |
| 2014/0317300 | A1* | 10/2014 | Ludwig | H04L 65/4069 709/226 |
| 2015/0124718 | A1* | 5/2015 | Molinero Fernandez | H04L 65/1016 370/329 |
| 2015/0131488 | A1* | 5/2015 | Perez Martinez | H04L 41/5025 370/259 |
| 2015/0172471 | A1* | 6/2015 | Castro Castro | H04W 76/10 370/329 |
| 2015/0222489 | A1* | 8/2015 | Perez Martinez | H04W 24/02 370/328 |
| 2015/0236862 | A1* | 8/2015 | Castro Castro | H04L 12/1407 370/259 |
| 2015/0236863 | A1* | 8/2015 | Castro Castro | H04L 12/1407 370/259 |
| 2015/0236914 | A1* | 8/2015 | Woods | H04L 41/0893 370/230 |

OTHER PUBLICATIONS

"3rd Generation Partnership Project; Technical Specification Group Services and System Aspects; Policy and Charging Control Architecture (Release 11)", 3GPP Standard; 3GPP TS 23.203, 3rd Generation Partnership Project (3GPP), Mobile Competence Centre; 650, Route Des Lucioles; F-06921 Sophia-Antipolis Cedex; France, vol. SA WG2, No. V11.7.0, Sep. 11, 2012 (Sep. 11, 2012), pp. 1-178, XP050648048.

"3rd Generation Partnership Project; Technical Specification Group Core network and Terminals; Policy and Charging Control (PCC) Reference Points (Release 11)", 3GPP Standard; 3GPP TS 29.212, 3rd Generation Partnership Project (3GPP), Mobile Competence Centre; 650, Route Des Lucioles; F-06921 Sophia-Antipolis Cedex; France, vol. CT WG3, No. V11.6.0, Sep. 21, 2012 (Sep. 21, 2012), pp. 1-194, XP050649625.

Orange "Selection of PCRF at the GW and at the AF", 3GPP Draft; S2-074375 PCRF Solution2, 3rd Generation Partnership Project (3GPP), Mobile Competence Centre; 650, Route Des Lucioles; F-06921 Sophia-Antipolis Cedex; France, vol. SA WG2, No. Kobe; Oct. 2, 2007, Oct. 2, 2007 (Oct. 2, 2007), XP050261184.

ZTE: "PCRF Selection", 3GPP Draft; S2-075065 PCRF Selection, 3rd Generation Partnership Project (3GPP), Mobile Competence Centre; 650, Route Des Lucioles; F-06921 Sophia-Antipolis Cedex; France, vol. SA WG2, No. Ljubljana; Nov. 2, 2007, Nov. 2, 2007 (Nov. 2, 2007), XP050261788, pp. 1-2.

Orange: "Selection of PCRF at the GW and at the AF", 3GPP Draft; S2-074374 PCRF Colution1, 3rd Generation Partnership Project (3GPP), Mobile Competence Centre; 650, Route Des Lucioles; F-06921 Sophia-Antipolis Cedex; France, vol. SA WG2, No. Kobe; Oct. 2, 2007, Oct. 2, 2007 (Oct. 2, 2007), XP050261183.

"3rd Generation Partnership Project; Technical Specification Group Services and System Aspects; General Packet Radio Service (GPRS) enhancements for Evolved Universal Terrestrial Radio Access Network (E-UTRAN) access", Mar. 2012, release 8, 3GPP, TS 23.401 V8.16.0.

"3rd Generation Partnership Project; Technical Specification Group Core Network and Terminals; Policy and Charging Control over Rx reference point", Dec. 2011, release 8, 3GPP, TS 29.214 V8.12.0.

Calhoun et al., "Diameter Based Protocol", Sep. 2003, RFC3588.

Westerinen et al., "Terminology for Policy-Based Management", Nov. 2001, RFC 3198.

French Search Report dated Jul. 18, 2013, from corresponding French Application No. 1259282.

Database WPI, Thomson Scientific, London, GB. XP002703240 (Nov. 14, 2007).

* cited by examiner

TECHNIQUE FOR COMMUNICATION BETWEEN A CLIENT ENTITY AND A PACKET MODE DATA NETWORK

CROSS-REFERENCE TO RELATED APPLICATIONS

This application is a Section 371 National Stage Application of International Application No. PCT/FR2013/052228, filed Sep. 24, 2013, the content of which is incorporated herein by reference in its entirety, and published as WO 2014/053739 on Apr. 10, 2014, not in English.

FIELD OF THE DISCLOSURE

The invention lies in the field of the management of a communication session between a client entity and an external packet mode data network, by way of a packet mode communication network, and more particularly that of the control of rules to be applied to the session and of the charging of data flows associated with this session.

BACKGROUND OF THE DISCLOSURE

Evolutionary upgrades of the UMTS ("Universal Mobile Terrestrial System") mobile communication network standardized by the 3GPP organization are under discussion. These upgrades constitute the basis of a future fourth generation and are also called LTE, for "Long Term Evolution". They provide in particular for an upgrade of the core network, EPC, for "Evolved Packet Core", in which the exchanges are performed solely in packet mode. Upon its attachment to the mobile communication network, a client entity or user equipment UE establishes a connection so as to send and receive IP data packets. A communication session is thereafter established between the client entity UE and an external packet mode data network by way of an access gateway to the network. This access gateway is the entity of the mobile communication network responsible for the interface with the external data network. Control and charging mechanisms, called "Policy and Charging Control" or PCC, are in particular provided to be applied to the sessions. The 3GPP document TS 23.203 specifies the implementation of this function in the core network EPC. Various functional entities are provided for, in particular, an entity for controlling rules PCRF, for "Policy and Charging Rules Function", an entity for applying these rules PCEF, for "Policy and Charging Enforcement Function" and an entity AF, for "Application Function", making it possible to implement dynamic control of rules and/or of charging for a service offered to client entities. The PCEF function is implemented at the level of the access gateway, which thus comprises a PCEF entity. Provision is made for the AF entity to be able communicate with the entity for controlling rules PCRF (or an agent entity) so as to transmit dynamic-session information and to receive notifications, for example relating to the occurrence of events. However, it is possible that no entity exists for controlling rules in the communication network. Moreover, even when such an entity does exist, it is possible that it may consent to receive commands originating only from certain AF entities. This leads to a failure of implementation of the resources command function.

SUMMARY

According to a first aspect, the subject of the invention is a method of communication between a rules application entity and a rules control entity in a communication network. The method comprises the following steps implemented by the rules control entity:

receiving from said application entity a request to open a command session relating to a communication session between a client entity and an external packet mode data network;

commanding said application entity to associate for said communication session at least one item of information relating to a resources command function with at least one application level message received from the client entity, said at least one item of information being intended to be used by an application entity situated in said external data network to implement a resources command for said session.

More precisely, the rules control entity commands said application entity to insert for said communication session at least one item of information relating to a resources command function into at least one application level message received from the client entity, said at least one item of information being intended to be used by an application entity situated in said external data network to implement a resources command for said session.

The invention stems from problems noted when the communication network is a 3GPP mobile network. The method of communication is however applicable to any packet mode communication network, in which provision is made for a resources command architecture, comprising a rules decision point PDP, for "Policy Decision Point", a rules application point PEP, for "Policy Enforcement Point", such as are defined in the IETF document RFC 3198, entitled "Terminology for Policy-Based Management", and an interface allowing an applications service provider ASP, for "Application Service Provider" to communicate with the rules decision point to transmit resources commands.

Moreover, the invention also stems from a problem associated with the support of a resources command function. The method of communication is also applicable for transmitting any item of information necessary for the implementation of the resources command function to the application entity.

The method of communication thus allows an application entity to contact the control entity or an agent of this control entity so as to transmit a resources command by using the item or items of information which have been transmitted to it. The interface between the application entity and the control entity (called the Rx interface in specification TS 23.203) can then be used to transmit one or more characteristics for this communication session. The control entity contacted directly or by way of the agent commands the rules application entity by way of which the data flow or flows associated with the communication session are forwarded. These characteristics may correspond for example to a request for resources to a level of quality of service, a bandwidth, etc. The control entity contacted directly or by way of an agent entity determines as a function of this or of these characteristics one or more rules to be applied and commands the rules application entity by way of which the data flow or flows associated with the communication session are forwarded. These rules may correspond for example to a function of control of the quality of service for an associated data flow by the communication session, to a function for forwarding or blocking a data flow (also called "gating control") or else of charging functions.

The various modes of embodiment or characteristics mentioned hereinafter can be added independently or in combination with one another, to the steps of the method of communication as defined above.

According to a particular characteristic, the item of information relates to a support of the resources command function by the control entity.

The application entity then transmits a resources command solely when the network comprises a rules control entity and when the rules control entity or an agent of this control entity is configured to receive such commands. This avoids a failure associated with the implementation of the resources command function.

According to a particular characteristic, the item of information is an identifier of a command entity to be contacted, said identifier being intended to be used by said application entity to transmit at least one characteristic for said session.

It is provided in paragraph 6.2.3 of TS 23.203 that the application entity determines the rules control entity to be contacted as a function of an address in the network of the client entity and/or of an identity of the client entity, known to the application entity. To implement this determination, the application entity obtains the address in the network of the client entity on the basis of the source address of the packet carrying a service request. When there exists one or more address translation devices NAT, for "Network Address Translation", on the path between the client entity and the application entity, the source address of the packet carrying the service request does not correspond to the address in the network of the client entity. It is therefore not possible in this case for the application entity to determine the control entity to be contacted on the basis of the source address of the packet received. Moreover, the identity under which the application knows the user of the client entity, for example connection or login information on a web application server, is often independent of the identities allocated by the network operator and does not therefore make it possible to determine the control entity to be contacted. This prevents the implementation of the resources command function, when several rules control entities are deployed in the communication network. Indeed, the application entity must be able to contact the control entity which commands the rules application entity by way of which the client entity communicates with the application.

The method of communication thus allows an application entity to directly contact the control entity or an agent of this control entity independently of the identity of the client entity present in the application level message or else in a packet carrying this application level message. The interface between the application entity and the control entity (called the Rx interface in specification TS 23.203) can then be used to transmit one or more characteristics for this communication session.

According to a particular characteristic, the command step is implemented as a function of a profile associated with a user of the client entity.

This makes it possible by configuration of the profile of the user of the client entity to command or otherwise the association of the item of information relating to a resources command function for the session.

According to a particular characteristic, the command step is implemented as a function of an identifier of the external data network.

This makes it possible to command or otherwise the association of the item of information relating to a resources command function for the session for certain external data networks.

According to a particular characteristic, the method of communication furthermore comprises a reception of a notification sent by said application entity subsequent to a reception of an application level message from the client entity and relating to an application, and in which the command step is implemented for an application level message relating to said application.

This makes it possible to command or otherwise the association of the item of information relating to a resources command function for certain applications. By way of nonlimiting example, the client entity can then obtain a higher quality of service for the distribution of a multimedia content.

According to a particular characteristic, the control entity furthermore commands said application entity to associate a session identifier with said at least one application level message received from the client entity.

When an item of address translation equipment is situated between the rules application entity and the application entity, the latter provides the control entity or an agent entity with an address obtained after translation, which does not allow the control entity to perform a session association. Indeed, specification TS 23.203 provides that the control entity implements a session association function (called "session binding" and described in paragraph 6.1.1.2 of specification TS 23.203) between an application session item of information and a communication session to correlate a request received from the application entity with the communication session ("IP-CAN session").

By virtue of this particular characteristic, the application entity can provide the rules control entity with a session identifier in the communication network, thus allowing the control entity to retrieve the client entity concerned and to perform the session association.

According to a second aspect, the invention also relates to a method of obtaining rules by a rules application entity from a rules control entity in a communication network. The method comprises the following steps implemented by the rules application entity:

receiving a request to open a communication session between a client entity and an external packet mode data network;

transmitting a request to open a command session relating to said communication session to said control entity;

receiving from said control entity a command of association for said communication session with at least one application level message received from the client entity at least one item of information relating to a resources command function for the session, said at least one item of information being intended to be used by an application entity situated in said external data network to implement a resources command for said session;

receiving an application level message from the client entity;

transmitting said message and said at least item of information.

The step of receiving from said control entity an association command is more precisely a step of receiving from said control entity a command of insertion for said communication session of at least one item of information relating to a resources command function for the session into at least one application level message received from the client entity, said at least one item of information being intended to be used by an application entity situated in said external data network to implement a resources command for said session.

The advantages stated in respect of the method of communication according to the first aspect are directly transposable to the method of obtaining rules.

According to a third aspect, the invention also relates to a rules control entity, designed to communicate with a rules application entity in a communication network, said entity comprising the following modules:
- a reception module, designed to receive from said application entity a request to open a command session relating to a communication session between a client entity and an external packet mode data network;
- a command module, designed to command said application entity to associate for said communication session at least one item of information relating to a resources command function for the session with at least one application level message received from the client entity, said at least one item of information being intended to be used by an application entity situated in said external data network to implement a resources command for said session.

More precisely the command module of the rules control entity is designed to command said application entity to insert for said communication session at least one item of information relating to a resources command function into at least one application level message received from the client entity for the session, said at least one item of information being intended to be used by an application entity situated in said external data network to implement a resources command for said session.

The advantages stated in respect of the method of communication according to the first aspect are directly transposable to the rules control entity.

According to a fourth aspect, the invention also relates to a rules application entity, designed to communicate with a rules control entity in a communication network, said entity comprising the following modules:
- a reception module, designed to
  - receive a request to open a communication session between a client entity and an external packet mode data network
  - receive from said control entity a command of association for said communication session with at least one application level message received from the client entity at least one item of information relating to a resources command function for the session, said at least one item of information being intended to be used by an application entity situated in said external data network to implement a resources command for said session;
- a first sending module, designed to transmit a request to open a command session relating to said communication session to said control entity;
- an association module, designed to associate with at least one application level message received for said session said at least one item of information;
- a second sending module, designed to transmit said message and said at least associated item of information.

More precisely, the reception module of the rules application entity is designed to receive from said control entity a command of insertion for said communication session of at least one item of information relating to a resources command function for the session into at least one application level message received from the client entity, said at least one item of information being intended to be used by an application entity situated in said external data network to implement a resources command for said session.

Likewise the association module of the rules application entity is more precisely designed to insert said at least one item of information into at least one application level message received for said session.

The advantages stated in respect of the method of obtaining according to the second aspect are directly transposable to the rules application entity.

According to a fifth aspect, the invention relates furthermore to a system for controlling rules in a communication network, comprising at least one rules control entity according to the third aspect, at least one rules application entity according to the fourth aspect and an application entity, designed to receive at least one item of information intended to be used to implement a resources command for a session.

The advantages stated in respect of the method of communication according to the first aspect are directly transposable to the system for controlling rules.

According to a sixth aspect, the invention relates to a program for a rules control entity, comprising program code instructions intended to command the execution of the steps of the method of communication described above, when said program is executed by said entity and a recording medium readable by a rules control entity and on which a program for an entity is recorded.

According to a seventh aspect, the invention relates to a program for a rules application entity, comprising program code instructions intended to command the execution of the steps of the method of obtaining described above, when said program is executed by said entity and a recording medium readable by a rules application entity and on which a program for an entity is recorded.

BRIEF DESCRIPTION OF THE DRAWINGS

The communication technique will be better understood with the aid of the following description of particular embodiments, with reference to the appended drawings in which.

DETAILED DESCRIPTION OF ILLUSTRATIVE EMBODIMENTS

Figure 1:
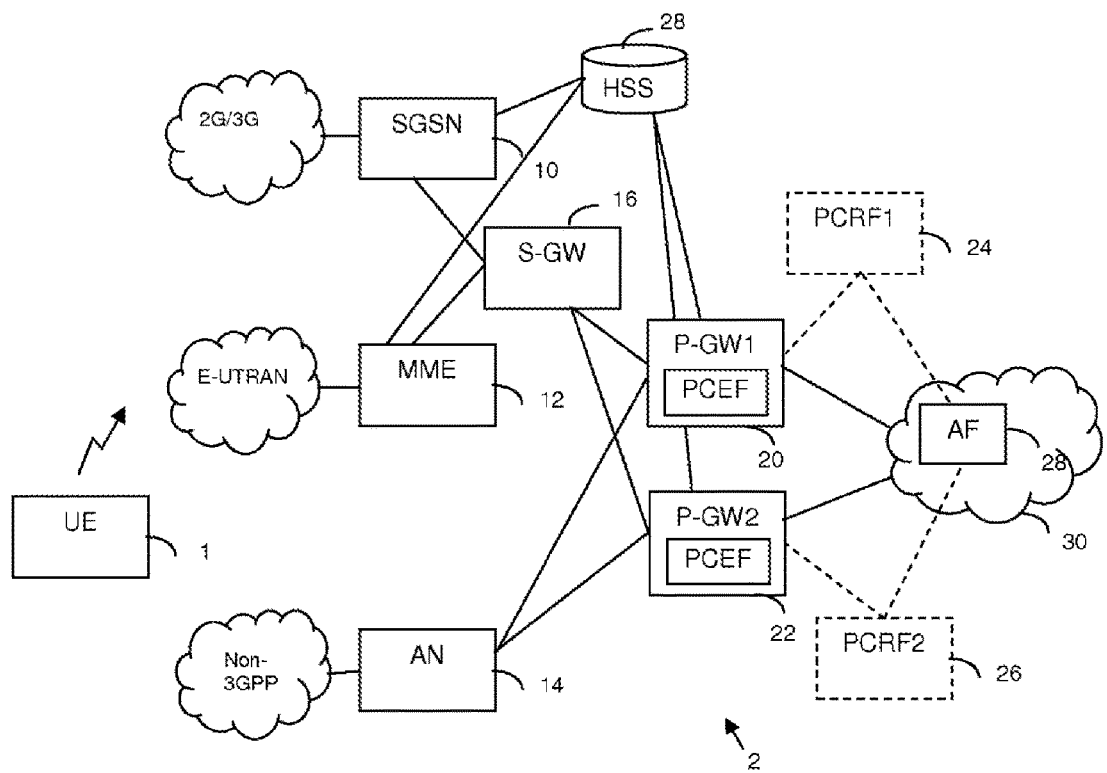
FIG. 1 represents in its environment a system for controlling rules according to a particular embodiment.

FIG. 1 represents in a simplified manner a packet mode communication network 2. A user equipment UE 1, also called a client entity, is represented in its environment. The user equipment 1 can access in packet mode an external data network 30 by way of various types of access networks. Here the particular case is considered where the communication network 2 complies with an EPS (for "Evolved Packet System") architecture such as defined in 3GPP specification TS 23 401 v8.16.0. It is stressed here that the versions corresponding to version 8 are mentioned subsequently. No limitation is attached to this version number, the method of communication also being applicable to later versions of these standards.

The access network can be radio, possibly complying with the specifications defined by the 3GPP standardization organization, or else wired.

A first type of access network corresponds to a second-generation 2G or else third-generation 3G radio access network. In this case, radio access is performed by way of GERAN (for "GSM/EDGE Radio Access network") equipment for 2G radio access, or else of UTRAN (for "UMTS Terrestrial Resource Access Network") equipment for 3G radio access.

A second type of access network corresponds to an LTE (for "Long Term Evolution") radio access network corresponding to the upgrades of the third generation and also called pre-4G. In this case, radio access is performed by way of E-UTRAN (for "Evolved UTRAN" equipment.

These first two types of access networks comply with all the specifications defined by the 3GPP standardization group.

A third type of access network groups together all accesses not complying with 3GPP. The third type of radio access network is linked to an access node equipment AN 14. This entails for example wired access of ADSL type, radio access by WIFI®, WiMAX for "Worldwide Interoperability for Microwave Access", CDMA, etc.

The first two types of access networks are linked respectively to mobility management equipment. For 2G/3G radio access, such an item of equipment 10 is called SGSN, for "Serving GPRS Service Node". For LTE radio access, such an item of equipment 12 is called MME, for "Mobility Management Equipment". These two items of mobility management equipment are linked to an attachment gateway 16 S-GW, for "Serving Gateway". They are also linked to a server of the subscribers of the network HSS 28, for "Home Subscriber System", this server storing all the subscription data of the subscribers of the communication network 2.

The attachment gateway 16 and the node access equipment 14 are linked to two access gateways P-GW1 20 and P-GW2 22. The access gateways P-GW1 and P-GW2 make it possible to access the data network 30 in packet mode. The gateway P-GW establishes the communication session between the user equipment UE and the external data network by providing an IP ("Internet Protocol") connectivity. By way of example, the data network 30 corresponds to the IP Internet public data network and allows access to services of Internet type. It can also correspond to a data network specific to an operator and allows access to services offered by this operator. An application server, more precisely the AF, for "Application Function", entity 28 allowing dynamic control of the rules and/or of the charging for a service, is also represented in FIG. 1. The application server makes it possible to provide a service to the user in the data network 30.

The communication network 2, such as represented in FIG. 1, comprises two systems for controlling PCC rules. A PCC ("Policy Control Function") rule such as defined in paragraph 3.1 of TS 23.203 corresponds to a set of information allowing the detection of a service data flow and providing parameters for the control of policies and/or of charging.

A rule control system comprises an entity for controlling rules PCRF and one or more entities implementing a function for applying rules PCEF. The rules application function PCEF makes it possible to ensure functionalities of charging and applying rules, under the control of the control entity PCRF. The control entity PCRF collects from several sources information related to the networks (type of radio access, addresses of gateways, location of the terminal of the client, etc.), information related to the subscription of the client, and information related to the applications used by the client on his terminal (type of application, type of media, etc.). The control entity PCRF has access to the client entity user subscription information stored in a database called SPR (for "Subscription Profile Repository") so as to be able to adapt the assignment of the transport resources by the service as well as the charging of the service as a function of the profile of the user of the client entity.

During the procedure for opening a communication session, the entity for applying rules PCEF opens a command session relating to the communication session with the entity for controlling rules PCRF and communicates to it information associated with this communication session (for example the type of radio access, the quality-of-service parameters requested, the bandwidth requested, etc.). As a function of these characteristics and of other information originating from several other sources, the control entity PCRF determines the initial policy (quality of service, charging tariff to be put in place, authorization of access) to be applied in respect of the various services carried by the communication session in progress. This policy can be modified as a function of events occurring during the communication session.

All the interfaces of the PCC architecture (except for the interface with the SPR database) are DIAMETER applications and rely on the DIAMETER basic protocol as defined in the IETF document RFC 3588.

The 3GPP specification TS 23.203 "Policy and charging control architecture" defines the architecture for the implementation of the PCC function.

The 3GPP specification TS 29.212 "Policy and Charging Control over Gx reference point" defines the interface between the control entity PCRF and the application entity PCEF.

The 3GPP specification TS 29.214 "Policy and Charging Control over Rx reference point" defines the interface between the control entity PCRF and the application entity AF.

Two control entities PCRF1 24 and PCRF2 26 are represented in FIG. 1. The control entity PCRF1 24 communicates with the access gateway P-GW1 20, implementing a function for applying rules PCEF. The control entity PCRF2 26 communicates with the access gateway P-GW2 22, implementing a function for applying rules PCEF.

Of course the communication network 2 represented in FIG. 1 comprises only a limited number of items of equipment represented so as not to overload this figure. No limitation is attached to this representation.

Subsequently, an association between an item of user equipment UE, represented by an IPv4 address and/or an IPv6 prefix, and a packet data network, represented by a data network identifier APN, for "Access Point Name", is called a communication session or connection to the packet data network. This session can equally well be called an "IP-CAN session", a "PDN Connection" for LTE access, a "PDP Context" for 2G/3G access.

Subsequently the particular case is considered where the exchanges between the user equipment UE and the application server 28 comply with the HTTP ("HyperText Transfer Protocol") protocol. It is stressed here that the HTTP protocol is given by way of nonlimiting example. It is thus possible to implement the method of communication for any type of protocol, such as the RTSP ("Real Time Streaming Protocol") protocol or even proprietary protocols.

A service data flow represents a flow of IP packets comprising one and the same source transport address (IP address, port number), one and the same destination transport address (IP address, port number) and one and the same transport protocol identifier.

A method of communication will now be described in conjunction with FIG. 2 in a first embodiment. Hereinafter, the description is focused on the steps of the method of communication that are implemented by the rules application entity PCEF1 (implementation by the access gateway P-GW1 20) and the control entity PCRF1 24. Subsequently, the acronyms PCEF and PCRF are used to designate respectively PCEF1 and PCRF1.

The description begins with a phase of initializing a connectivity ("PDN connectivity") implemented between the user equipment UE and the attachment gateway S-GW 16. The gateway S-GW then transmits to the access gateway P-GW1 a message M1 "Create Session Request", as described in paragraph 5.3.2.1 of the specification 23.401 for example.

On receipt of this message M1, the rules application entity PCEF transmits to the rules control entity PCRF a request to open a command session relating to the communication session between the user equipment and the external packet mode data network, that is to say a message M2 "Indication of IP-CAN Session Establishment", as defined in specification TS 23.203 (paragraph 7.2). More precisely this message M2 is a Diameter message "Credit Control Request Initiate" (as defined in the specification TS 29.212 v. 8.16.0), comprising in particular the international number of the user of the client entity MSISDN (for "Mobile Subscriber Integrated Services Digital Network-Number") and an identifier of the external data network APN.

In a step E1, the control entity PCRF determines as described previously policies to be applied to this communication session. Still in this step E1, the control entity determines whether it is necessary to provide the application entity AF 28 with one or more items of information relating to a resources command function. In a first variant of this first embodiment, the control entity determines whether it is necessary to provide the application entity AF 28 with an item of information relating to a support of the resources command function for the session. In this case, this item of information is provided in an explicit manner. In a second variant of this first embodiment, the control entity determines whether it is necessary to provide the application entity AF 28 with an identifier of a command entity to be contacted. The provision of this identifier indicates in an implicit manner that the resources command function is supported for this session by the control entity. In a third variant of this first embodiment, the control entity determines whether it is necessary to provide the application entity AF 28 with an item of information relating to a support of a resources command function for this session and an identifier of a command entity to be contacted. The item of information relating to a support of a resources command function and an identifier of a command entity to be contacted thus correspond to information relating to the resources command function.

The identifier of a command entity to be contacted is intended to be used by the application entity situated in the external data network to transmit at least one characteristic for the communication session. The command entity to be contacted can be directly the control entity PCRF or else an agent entity, such as a Diameter routing entity ("Diameter Routing Agent").

In a particular embodiment, the identifier of the command entity to be contacted is an IP address. In another embodiment, the identifier of the command entity to be contacted is a fully qualified domain name FQDN. No limitation is attached to the structure of this identifier.

In a particular embodiment, the item of information relating to the resources command function is provided as a function of the data network identifier. This entails for example providing it for certain identifiers of data networks, for example data networks for which favored agreements exist.

In another particular embodiment, the item of information relating to the resources command function is provided as a function of the profile of the user of the client entity. This entails for example providing it for certain profiles, for example ones that may have access to a higher quality of service.

In yet another particular embodiment, the item of information relating to the resources command function is provided as a function of the identifier of the data network and of the profile of the user of the client entity.

In response to the message M2 requesting opening of a command session, the control entity PCRF transmits to the application entity PCEF an acknowledgment message M3 "Ack IP-CAN Session Establishment", comprising PCC rules to be applied to the communication session. When the control entity has determined that one or more items of information relating to the resources command function must be provided to the application entity, the message M3 also commands the application entity to associate for the communication session at least one item of information relating to the resources command function with one or more application level messages received from the client entity. More precisely this message M3 is a Diameter message "Credit Control Answer", comprising in particular the PCC rules, the command instruction and the item of information relating to the resources command function.

This message M3 is received by the application entity PCEF in a step F1. In accordance with the reference specifications, the application entity PCEF installs the PCC rules. As a function of the presence or otherwise of the command instruction, the application entity PCEF installs a process for supervising the application level messages.

A message M4 "Create Session Response" is transmitted by the access gateway P-GW to the attachment gateway S-GW, in accordance with the reference specifications so as to finalize the establishment of the communication session.

Once the communication session has been established, the user equipment UE can transmit application level messages destined for an item of equipment of the external data network 30.

Figure 2:
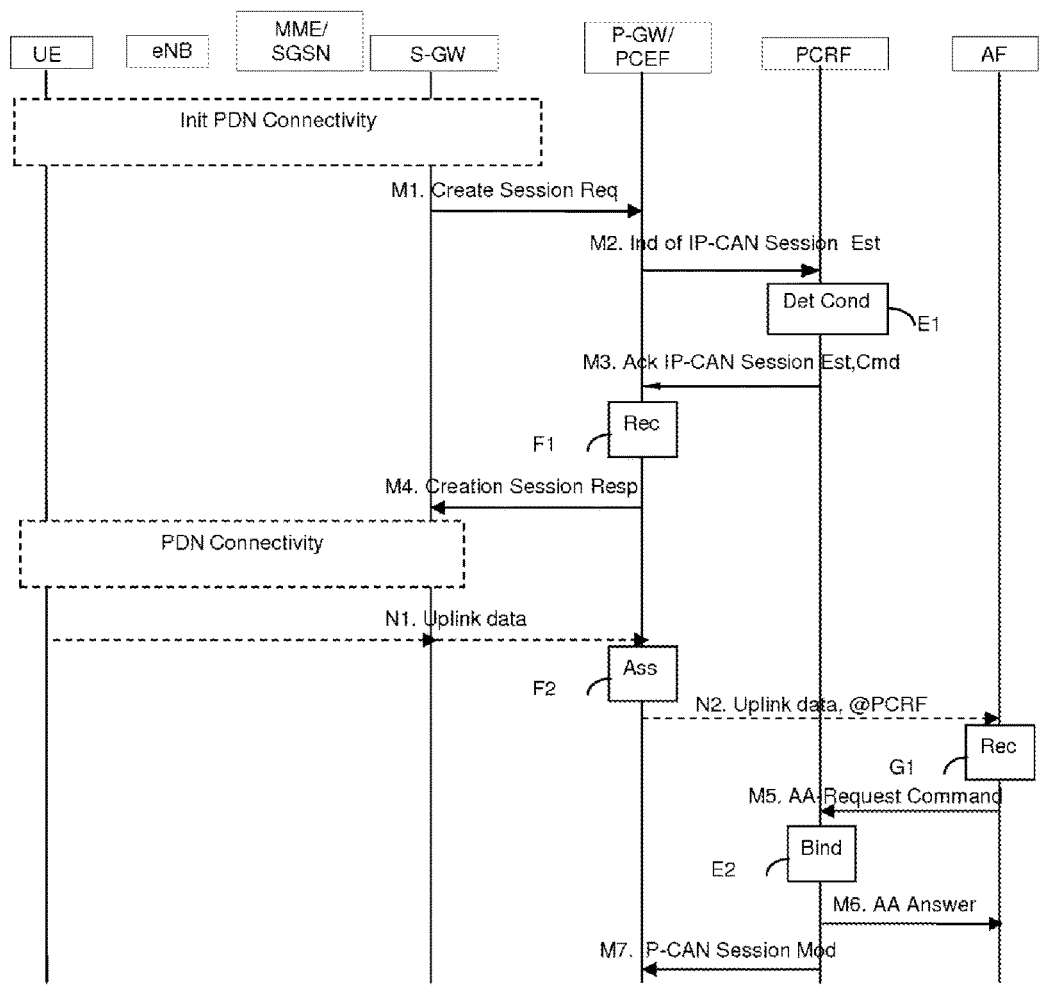
FIG. 2 represents steps of a method of communication in a first particular embodiment.

This is represented in FIG. 2 in the form of a message N1. It is recalled here that this message N1 is transmitted in the transport plane and that the access gateway P-GW is a compulsory point of transit of all the packets transmitted by the user equipment destined for the external data network and vice versa.

The access gateway P-GW receives this message N1 in a step F2 and applies by way of the application entity PCEF the PCC rules that it has received from the control entity PCRF in the message M3. The supervision process also detects that the message N1 is an application level message and that consequently a particular processing must be performed. This particular processing corresponds to performing an association of the item or items of information relating to the resources command function with the message N1 to form a message N2.

In a particular embodiment, the association consists in inserting into the application level message N1 an information element comprising the item of information relating to a support of a resources command function and/or the identifier of the command entity to be contacted.

No limitation is attached to this insertion-based association scheme given by way of nonlimiting example. Any other scheme guaranteeing that this association does not disturb the reception and the processing of the message N2 in case of non-compatibility at the protocol level is conceivable.

In a particular embodiment, the association implemented by the application entity PCEF is performed for all the application level messages carried by the communication session. In another embodiment, the association implemented by the application entity PCEF is performed solely for the first application level message carried by the communication session.

The message N2 is thereafter forwarded to the external data network 30, more precisely to the application entity 28, where it is received in a step G1.

In this step G1, the application entity 28 determines whether modifications must be applied to the communication session. For example, this may entail authorizing a higher quality of service for this session. The application entity 28 also obtains in this step G1 on the basis of the message N2 the item or items of information relating to the resources command function.

It is stressed here that when the communication network does not comprise any rules control entity or else when no rules control entity is configured to receive resource commands originating from this application entity, the resources command function may not be implemented.

For this first embodiment the case is considered where the communication network comprises a rules control entity and the latter is configured to receive commands originating from the application entity 28. When modifications must be applied to the communication session, the application entity 28 transmits them to the control entity PCRF. When the identifier of the command entity to be contacted is obtained from the message N2, the application entity 28 transmits them to this command entity. In the illustrative example of FIG. 2, the control entity PCRF corresponds to the command entity to be contacted. More precisely the application entity AF 28 transmits a message M5 to the control entity PCRF. This message M5 corresponds to a message AA-Request Command (AA for "AUTHORIZE_AUTHENTICATE"), comprising modified information elements or "Media-Component-Description AVP(s)", in accordance with the specification TS 29.214 v. 8.12.0 (paragraph 4.4.2).

In a step E2, this message M5 is acknowledged by the control entity PCRF by a message M6 AA-Answer.

Still in this step E2, the control entity PCRF determines the corresponding command session and transmits to the application entity PCEF a message M7 "IP-CAN Session Modification" comprising new PCC rules. More precisely the message M7 corresponds to a Diameter message "Credit Control Request Update".

The application entity AF 28 is thus able to trigger the resources command function when the communication network comprises a rules control entity and when the latter consents to receive commands for resources originating from this application entity. The application entity transmits to the rules control entity, which manages the communication session with the client entity, one or more characteristics for the communication session by virtue of the reception of an identifier of a command entity to be contacted.

A second embodiment will now be described in conjunction with FIG. 3.

The 3GPP standardization organization has provided onwards of version 10 (release 10) of the specifications a particular resources command functionality, that is to say a partnership function also called "Sponsored Data Connectivity". This partnership functionality allows a third party or "sponsor" to totally or partly bear the costs associated with the communication session. Annex N of TS 23.203 describes the use of the PCC rules for the implementation of this functionality. The second embodiment is described within the framework of this partnership function but remains applicable to any resources command function.

Hereinafter, the framework considered is that of version 11 of the specifications.

The method of communication in this second embodiment starts in a similar manner to the first embodiment, the access gateway P-GW receiving a message O1 "Create Session Request", similar to the message M1.

On receipt of this message O1, the rules application entity PCEF transmits to the rules control entity PCRF a request to open a command session relating to the communication session between the user equipment and the external packet mode data network, that is to say a message O2 "Indication of IP-CAN Session Establishment", similar to the message M2 described previously in conjunction with the first embodiment.

In a step H1, the control entity PCRF determines as described previously policies to be applied to this communication session. Still in this step H1, the control entity PCRF also determines one or more applications for which the application entity PCEF must notify the control entity PCRF of the start or the end of the application session. The control entity PCRF thus obtains ADC (for "Application Detection and Control") rules. Such an application corresponds for example to an application for which a partnership agreement is provided. The application can be defined by an application identifier within the sense of the ADC functionality, a URL ("Uniform Resource Locator") universal address or else a list of universal addresses, a fully qualified domain name FQDN or a group of such domain names, a data network identifier APN, an IP address or a group of IP addresses, etc.

In response to the message O2 requesting opening of a command session, the control entity PCRF transmits to the application entity PCEF an acknowledgment message O3 "Ack IP-CAN Session Establishment", comprising PCC rules and ADC rules to be applied to the communication session. More precisely this message O3 is a Diameter message "Credit Control Answer", comprising in particular the PCC rules and the ADC rules.

This message O3 is received by the application entity in a step I1. In accordance with the reference specifications, the application entity PCEF installs the PCC rules and the ADC rules. The ADC rules make it possible to supervise application level messages.

A message O4 "Create Session Response" is transmitted by the access gateway P-GW to the attachment gateway S-GW, in accordance with the reference specifications so as to finalize the establishment of the communication session.

Once the communication session has been established, the user equipment UE can transmit application level messages destined for an item of equipment of the external data network 30.

Figure 3:
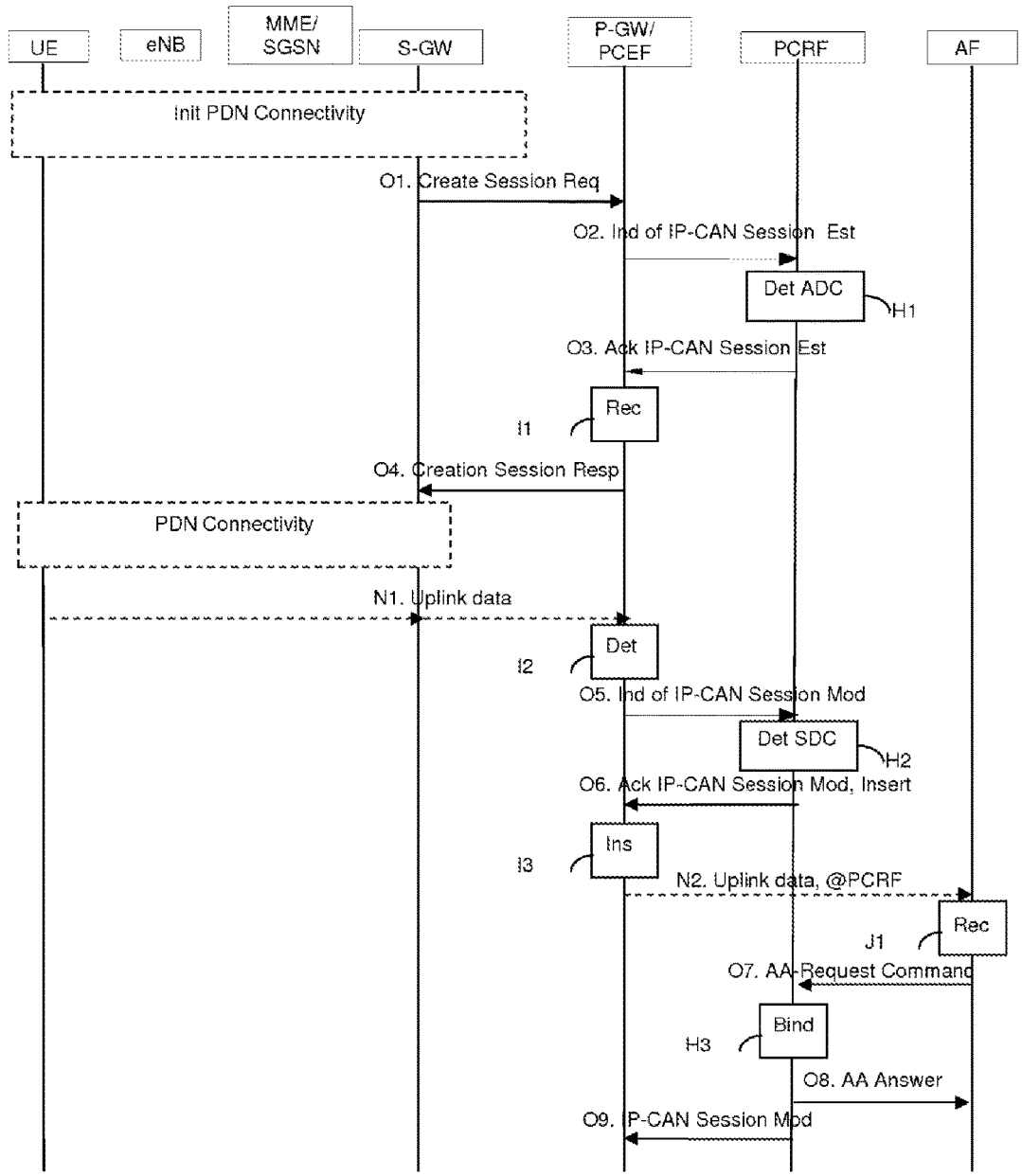
FIG. 3 represents steps of the method of communication in a second particular embodiment.

This is represented in FIG. 3 in the form of the message N1.

In a step I2, the access gateway P-GW receives this message N1 and applies by way of the application entity PCEF the PCC rules that it has received from the control entity PCRF in the message O3. The supervision process also detects that the message N1 is an application level message, corresponding to an application for which the control entity PCRF has asked to be notified of the start of the application session.

This detection triggers the dispatching by the access gateway P-GW of a message O5 "Indication of IP-CAN Session Modification" to the control entity PCRF.

In a step H2, the control entity PCRF receives the message O5 and determines whether it is necessary to provide the application entity AF 28 with one or more items of information relating to the resources command function: an item of information relating to a support of a partnership function for the session and/or an identifier of a command entity to be contacted.

In a particular embodiment, these two items of information are provided as a function of the application aimed at. This entails for example providing them for certain applications for which partnership agreements exist.

In another particular embodiment, these two items of information are provided as a function of the profile of the user of the client entity. The decision to implement the partnership agreement is taken thereafter by the application entity 28.

In another particular embodiment, these two items of information are provided as a function of the application aimed at and of the profile of the user of the client entity.

In another particular embodiment, these two items of information are provided systematically. The decision to implement the partnership agreement for this client entity is taken thereafter by the application entity 28.

Still in this step H2, the control entity PCRF transmits a message O6 "Ack IP-CAN Session Modification" to the application entity PCEF. When the two items of information must be provided, the message O6 also commands the application entity to associate these two items of information with one or more application level messages relating to this application and received from the client entity.

In a step I3, the access gateway P-GW associates these two items of information with the message N1 to form a message N2.

In a particular embodiment, the association consists in inserting into the application level message N1 two information elements comprising respectively the item of information relating to a support of the partnership function and the identifier of the command entity to be contacted.

In another embodiment, the association consists in inserting into the application level message N1 an information element comprising the two items of information.

No limitation is attached to this insertion-based association scheme given by way of nonlimiting example. Any other scheme guaranteeing that this association does not disturb the reception and the processing of the message N2 in case of non-compatibility at the protocol level is conceivable.

In a particular embodiment, the association implemented by the application entity PCEF is performed for all the application level messages relating to an application carried by the communication session. In another embodiment, the association implemented by the application entity PCEF is performed solely for the first application level message relating to an application carried by the communication session.

The message N2 is thereafter forwarded to the external data network 30, more precisely to the application entity 28, where it is received in a step J1.

In this step J1, the application entity 28 obtains the two items of information on the basis of the message N2. The application entity 28 also determines whether modifications must be applied to the communication session.

When modifications must be applied to the communication session, the application entity 28 transmits them to the command entity to be contacted as well as an identity of the partner. More precisely the application entity AF 28 transmits a message O7 to the control entity PCRF. This message O7 corresponds to a message AA-Request Command, similar to the message M5 described previously in conjunction with the first embodiment.

In a step H3, this message O7 is acknowledged by the control entity PCRF by a message O8 AA-Answer.

Still in this step H3, the control entity PCRF determines the corresponding command session and transmits to the application entity PCEF a message O9 "IP-CAN Session Modification" comprising new PCC rules, similar to the message M7 described previously in conjunction with the first embodiment.

The application entity AF 28 is thus able to trigger the partnership function when the rules control entity supports it and to transmit one or more characteristics for the communication session by virtue of the reception of an identifier of a command entity to be contacted. It is thus possible to implement the partnership function progressively even before the set of rules control entities supports this function.

The method of communication furthermore makes it possible to activate the partnership function session by session.

Correlatively, the rules application entity thus obtains rules from a rules control entity in a communication network by a method of obtaining rules. This method comprises the following steps implemented by the rules application entity:
  receiving a request to open a communication session between a client entity and an external packet mode data network;
  transmitting to this control entity a request to open a command session relating to this communication session;
  receiving from the control entity a command of association for this communication session with at least one application level message received from the client entity at least one item of information relating to a resources command function, this at least item of information being intended to be used by an application entity situated in this external data network to implement a resources command for this session;
  receiving an application level message from the client entity;
  transmitting the message received and this at least associated item of information.

Various embodiments and various variants are also provided for this method of obtaining rules as a function of the corresponding method of communication and are not described in an exhaustive manner.

In a particular embodiment, when an item of address translation equipment is situated between the access gateway P-GW and the application entity AF 28, the control entity PCRF furthermore commands (in step E1 for the first mode or in step H2 for the second mode) the application entity PCEF to associate a session identifier with at least one application level message received from the client entity. This session identifier also corresponds to an item of information relating to a resources command function. In one embodiment, the session identifier corresponds to a pair of items of information, comprising an address of the client entity in the communication network and a port number (corresponding to the information associated with the communication session available to the rules control entity). In another embodiment, the session identifier is assigned by the control entity PCRF and the latter stores a lookup table of the correspondence between this session identifier and the pair of items of information. By virtue of the session identifier, the rules control entity PCRF can implement the session association.

In a particular embodiment, the control entity PCRF furthermore commands (in step E1 for the first mode or in step H2 for the second mode) the application entity PCEF to associate with at least one application level message received from the client entity an item of information relating to a protocol to be used to contact this command entity. This item of information relating to a protocol also corresponds to an item of information relating to a resources command function. By way of illustrative example, when the identifier of the command entity to be contacted is provided in the form of a uniform resource identifier URI, the protocol identifier is then specified in the following form:

aaa://perfl.orange.com:6666;transport=tcp;
protocol=diameter.

Figures 4, 5:
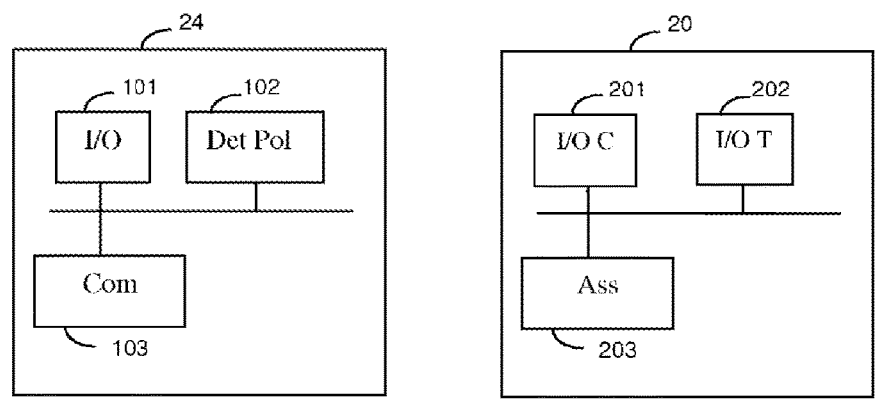
FIG. 4 represents a rules control entity according to a particular embodiment.
FIG. 5 represents a rules application entity according to a particular embodiment.

We shall now describe a rules control entity 24 in a particular embodiment with reference to FIG. 4.

The rules control entity 24 comprises in particular:

a module for sending and receiving 101 in the control plane, designed to communicate with one or more rules application entities;

a determination module 102, designed to determine rules to be applied to a communication session and to determine whether an application entity must be provided with one or more items of information relating to a resources command function;

a command module 103, designed to command the entity for applying rules to associate for a communication session this at least one item of information with at least one application level message received from the client entity, said at least item of information being intended to be used by the application entity situated in said external data network to implement a resources command for said session.

The sending/receiving module 101 is in particular designed to receive from the application entity a request to open a command session relating to a communication session between a client entity and an external packet mode data network.

In a particular embodiment, the determination module 102 also determines ADC rules. The association is then commanded by the command module 103 for at least one application level message relating to an application, detected by the rules application entity.

We shall now describe a rules application entity 20 in a particular embodiment with reference to FIG. 5.

The rules application entity 20 comprises in particular:

a first module for sending/receiving 201 in the command plane, designed to communicate with the rules control entity 24 and with an attachment gateway;

an association module 203, designed to associate with at least one application level message received for said session at least one item of information relating to a resources command function;

a second module for sending/receiving 202 in the transport plane, designed to receive an application level message and to transmit said message and said at least associated item of information.

The sending/receiving module 201 is in particular designed to:

receive a request to open a communication session between a client entity and an external packet mode data network;

transmit to the control entity a request to open a command session relating to this communication session;

receive from the control entity a command of association for a communication session with at least one application level message received from the client entity at least one item of information relating to a resources command function for the session, this at least one item of information being intended to be used by an application entity situated in said external data network to implement a resources command for said session.

In a particular embodiment, the sending/receiving module 201 is also designed to receive ADC rules to be applied to the communication session and to notify the entity for controlling rules as a function of the ADC rules of the events associated with an application. The association command then relates to at least one application level message relating to this detected application.

The invention relates furthermore to a system for controlling rules in a communication network 2, comprising at least one rules control entity PCRF such as described above, at least one rules application entity PCEF such as described above and an application entity, designed to receive at least one item of information intended to be used to implement a resources command for a session.

The method of communication and method of obtaining are implemented by means of software and/or hardware components. In this regard, the term "module" can correspond in this document either to a software component, or to a hardware component or to a set of hardware components and/or software components, which is able to implement a function or a set of functions, according to what is described above in respect of the module concerned.

A software component corresponds to one or more computer programs, one or more subprograms of a program, or more generally to any element of a program or of a piece of software. Such a software component is stored in memory and then loaded and executed by a data processor of a physical entity and is able to access the hardware resources of this physical entity (memories, recording media, communication buses, electronic input/output cards, user interfaces, etc).

In the same manner, a hardware component corresponds to any element of a hardware set. This may or may not involve a programmable hardware component, with or without integrated processor for the execution of software. This entails for example an integrated circuit, a chip card, an electronic card for the execution of firmware, etc.

In a particular embodiment, the modules 101, 102, 103 are designed to implement the method of communication described above. These preferably entail software modules comprising software instructions for executing the steps of the method described above and which are implemented by the rules control entity 24. The invention therefore also relates to:

a computer program for a control entity, comprising program code instructions intended to command the execution of the steps of the above-described method, when said program is executed by this entity;

a recording medium readable by a rules control entity on which the program for entity is recorded.

In a particular embodiment, the modules 201, 202, 203 are designed to implement the above-described method of obtaining rules. These preferably entail software modules comprising software instructions for executing the steps of the above-described method and which are implemented by the rules application entity 20. The invention therefore also relates to:

a computer program for a rules application entity, comprising program code instructions intended to command the execution of the steps of the above-described method, when said program is executed by this entity;

a recording medium readable by a rules application entity on which the program for entity is recorded.

The software modules can be stored in or transmitted by a data medium. The latter can be a hardware storage medium, for example a CD-ROM, a magnetic diskette or a hard disk, or else a transmission medium such as an electrical, optical or radio signal, or a telecommunication network.

The particular embodiments have been described within the framework of the 3GPP specifications for a mobile communication network. They are readily transposable to any packet mode communication network, in which provision is made for a resources command architecture, comprising a rules decision point PDP, a rules application point PEP, such as defined in the IETF document RFC 3198, and an interface allowing an applications service provider ASP to communicate with the rules decision point.

An embodiment of the invention remedies inadequacies/drawbacks of the prior art and/or affords improvements thereto.

Although the present disclosure has been described with reference to one or more examples, workers skilled in the art will recognize that changes may be made in form and detail without departing from the scope of the disclosure and/or the appended claims.

The invention claimed is:

1. A method of communication between a rules application entity and a rules control entity in a communication network, said method comprising the following acts implemented by the rules control entity:
receiving from said rules application entity a request to open a command session relating to an IP-CAN (Internet Protocol Connectivity Access Network) session between a client entity and an application function in an external packet mode data network;
commanding, as a function of an identifier of the external packet data network, said rules application entity to insert for said IP-CAN session at least one item of information, comprising a session identifier, into at least one application level message received from the client entity, indicating that the rules control entity is configured to receive a resources command from the application function, wherein the session identifier is based on at least one of an address or a port number of the client entity;
receiving from the application function at least one characteristic relating to a request for resources level of quality of service for the IP-CAN session, the characteristic being based on the item of information;
determining at least one rule to be applied, as a function of the at least one characteristic received from the application function; and
transmitting to the rules application entity the at least one rule to be applied on the IP-CAN session.

2. The method as claimed in claim 1, in which said item of information comprises an identifier of a command entity to be contacted, said identifier of the command entity being configured to be used by said application function to transmit at least one characteristic for said session.

3. The method as claimed in claim 1, in which the act of commanding is implemented as a function of a profile associated with a user of the client entity.

4. The method as claimed in claim 1, in which the act of commanding is implemented as a function of an identifier of the external data network.

5. The method as claimed in claim 1, furthermore comprising receiving a notification sent by said rules application entity subsequent to a reception of an application level message from the client entity and relating to an application, and in which the act of commanding is implemented for an application level message relating to said application.

6. The method as claimed in claim 1, in which the rules control entity furthermore commands said rules application entity to associate a session identifier with said at least one application level message received from the client entity.

7. The method as claimed in claim 1, wherein said at least one item of information is configured to be used by the application function situated in said external data network to implement the resources command for said session.

8. A method of obtaining rules by a rules application entity from a rules control entity in a communication network, said method comprising the following acts implemented by the rules application entity:
receiving a request to open an IP-CAN (Internet Protocol Connectivity Access Network) session between a client entity and an application function in an external packet mode data network;
transmitting a request to open a command session relating to said IP-CAN session to said rules control entity;
receiving from said rules control entity a command of insertion, as a function of an identifier of the external packet data network, for said IP-CAN session of at least one item of information, comprising a session identifier, into at least one application level message received from the client entity, indicating that the rules control entity is configured to receive a resources command from the application function, wherein the session identifier is based on at least one of an address or a port number of the client entity;
receiving an application level message from the client entity;
inserting said item of information into the at least one application level message received for said IP-CAN session;
transmitting said message comprising said item of information to the application function; and
receiving from the rules control entity at least one rule to be applied on said IP-CAN session, the rule being determined by the rules control entity on the basis of at least one characteristic, relating to a request for resources level of quality of service and being based on the item of information, for the IP-CAN session.

9. The method as claimed in claim 8, wherein said at least one item of information is configured to be used by the application function situated in said external data network to implement the resources command for said session.

10. A system for controlling rules in a communication network, comprising at least one rules control entity and at least one rules application entity, wherein
said rules control entity comprises a non-transitory computer-readable medium comprising instructions stored thereon, and a data processor configured by the instructions to:

receive, over the communication network, from said rules application entity a request to open a command session relating to an IP-CAN (Internet Protocol Connectivity Access Network) session between a client entity and an application function in an external packet mode data network;

transmit a command, as a function of an identifier of the external packet data network, to said rules application entity to insert for said IP-CAN session at least one item of information, comprising a session identifier, into at least one application level message received from the client entity, indicating that the rules control entity is configured to receive a resources command from the application function, wherein the session identifier is based on at least one of an address or a port number of the client entity;

receive from the application function at least one characteristic for the IP-CAN session, the characteristic being based on the item of information;

determine at least one rule to be applied, as a function of the at least one characteristic received from the application function; and transmit to the rules application entity the at least one rule to be applied on the IP-CAN session;

said rules application entity comprises a non-transitory computer-readable medium comprising instructions stored thereon, and a data processor configured by the instructions to:

receive a request to open the IP-CAN session between the client entity and the application function in the external packet mode data network;

transmit the request to open the command session relating to said IP-CAN session to said rules control entity;

receive from said rules control entity the command to insert, as a function of an identifier of the external packet data network, for said IP-CAN session the at least one item of information, comprising the session identifier, into the at least one application level message received from the client entity, indicating that the rules control entity is configured to receive a resources command from the application function;

receive an application level message from the client entity;

insert said at least one item of information into the at least one application level message received for said IP-CAN session;

transmit said message comprising said at least one item of information; and receive from the rules control entity the at least one rule to be applied on said IP-CAN session, the rule being determined by the rules control entity on the basis of the at least one characteristic, relating to a request for resources level of quality of service and being based on the at least one item of information.

11. A hardware storage medium readable by a rules control entity and on which a program comprising program code instructions is stored thereon, wherein the instructions command execution of a method of communication between a rules application entity and a rules control entity in a communication network, when said program is executed by the rules control entity, said method comprising the following acts implemented by the rules control entity:

receiving from said rules application entity a request to open a command session relating to an IP-CAN (Internet Protocol Connectivity Access Network) session between a client entity and an application function in an external packet mode data network;

commanding, as a function of an identifier of the external packet data network, said rules application entity to insert for said IP-CAN session at least one item of information comprising a session identifier, into at least one application level message received from the client entity, indicating that the rules control entity is configured to receive a resources command from the application function, wherein the session identifier is based on at least one of an address or a port number of the client entity;

receiving from the application function at least one characteristic relating to a request for resources level of quality of service for the IP-CAN, the characteristic being based on the at least one item of information;

determining at least one rule to be applied, as a function of the at least one characteristic received from the application function, transmitting to the rules application entity the at least one rule to be applied on the IP-CAN session.

12. The hardware storage medium as claimed in claim 11, wherein said at least one item of information is configured to be used by the application function situated in said external data network to implement the resources command for said session.

13. A hardware storage medium readable by a rules application entity and on which a program comprising program code instructions is stored thereon, wherein the instructions command execution of a method of obtaining rules by a rules application entity from a rules control entity in a communication network, when said program is executed by the rules application entity, said method comprising the following acts implemented by the rules application entity:

receiving a request to open an IP-CAN (Internet Protocol Connectivity Access Network) session between a client entity and an application function in an external packet mode data network;

transmitting a request to open a command session relating to said IP-CAN session to said rules control entity;

receiving from said rules control entity a command of insertion, as a function of an identifier of the external packet data network, for said IP-CAN session of at least one item of information, comprising a session identifier, into at least one application level message received from the client entity, indicating that the rules control entity is configured to receive a resources command from the application function, wherein the session identifier is based on at least one of an address or a port number of the client entity;

receiving an application level message from the client entity;

inserting said at least one item of information into the at least one application level message received for said IP-CAN session;

transmitting said message comprising said at least one item of information to the application function; and receiving from the rules control entity one rule to be applied on said IP-CAN session, the rule being determined by the rules control entity on the basis of at least one characteristic, relating to a request for resources level of quality of service and being based on the at least one item of information, for the IP-CAN session.

14. The hardware storage medium as claimed in claim 13, wherein said at least one item of information is configured to be used by the application function situated in said external data network to implement the resources command for said session.

\* \* \* \* \*